(12) United States Patent
Ishibashi et al.

(10) Patent No.: US 8,676,496 B2
(45) Date of Patent: Mar. 18, 2014

(54) CAR NAVIGATION APPARATUS

(75) Inventors: Masaki Ishibashi, Tokyo (JP); Hiroshi Machino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 913 days.

(21) Appl. No.: 10/576,087

(22) PCT Filed: Jun. 13, 2005

(86) PCT No.: PCT/JP2005/010806
§ 371 (c)(1),
(2), (4) Date: Apr. 14, 2006

(87) PCT Pub. No.: WO2006/030568
PCT Pub. Date: Mar. 23, 2006

(65) Prior Publication Data
US 2009/0018764 A1 Jan. 15, 2009

(30) Foreign Application Priority Data
Sep. 13, 2004 (JP) ................ P2004-265352

(51) Int. Cl.
*G01C 21/00* (2006.01)
*G08G 1/123* (2006.01)
*G01C 21/34* (2006.01)

(52) U.S. Cl.
USPC .......... 701/426; 701/408; 701/409; 701/410; 701/425; 701/437; 340/988; 340/995.1; 340/995.17; 340/995.19; 340/995.24

(58) Field of Classification Search
USPC .............. 701/200–202, 207–216, 23, 25, 26, 701/117, 400, 408, 409, 410, 425, 426, 428, 701/430, 432, 437, 438, 439, 440, 457, 461, 701/538, 540, 302; 340/988, 995.1–995.27
See application file for complete search history.

(56) References Cited

U.S. PATENT DOCUMENTS

| 5,043,902 | A | * | 8/1991 | Yokoyama et al. | ........... 701/211 |
| 5,191,532 | A |   | 3/1993 | Moroto et al. | |
| 5,864,771 | A | * | 1/1999 | Yokoyama et al. | ............. 701/51 |
| 5,893,045 | A | * | 4/1999 | Kusama et al. | ............... 701/428 |

(Continued)

FOREIGN PATENT DOCUMENTS

DE 102 34 563 A1 6/2003
JP 9-133541 A 5/1997

(Continued)

*Primary Examiner* — Rami Khatib
(74) *Attorney, Agent, or Firm* — Birch, Stewart, Kolasch & Birch, LLP.

(57) ABSTRACT

A car navigation apparatus includes an intersection searching means 14 for searching for intersections in a vicinity of the current position of a vehicle from intersections which exist on a searched route and which exist between the current position and a destination, an intersection name outputting means 15 for outputting the names of the searched intersections, an intersection selecting means 17 for selecting an intersection from the intersection names outputted, an facility searching means 18 for searching for facilities which exist in a vicinity of the intersection selected through the map data, a facility name outputting means 19 for outputting the names of the searched facilities, a facility selecting means 20 for selecting a facility from the facility names outputted, and a facility information outputting means 21 for extracting facility information about the selected facility from the map data, and for outputting the facility information.

14 Claims, 7 Drawing Sheets

(56) References Cited

U.S. PATENT DOCUMENTS

| | | | |
|---|---|---|---|
| 5,961,572 A | 10/1999 | Craport et al. | |
| 6,088,649 A * | 7/2000 | Kadaba et al. | 701/201 |
| 6,119,066 A * | 9/2000 | Sugiura et al. | 701/428 |
| 6,178,377 B1 | 1/2001 | Ishihara et al. | |
| 6,212,472 B1 * | 4/2001 | Nonaka et al. | 701/208 |
| 6,249,740 B1 * | 6/2001 | Ito et al. | 701/200 |
| 6,259,987 B1 * | 7/2001 | Ceylan et al. | 701/532 |
| 6,278,940 B1 | 8/2001 | Endo | |
| 6,282,489 B1 | 8/2001 | Bellesfield et al. | |
| 6,282,492 B1 * | 8/2001 | Gorai et al. | 701/209 |
| 6,360,168 B1 * | 3/2002 | Shimabara | 701/211 |
| 6,804,603 B2 * | 10/2004 | Ukita | 701/426 |
| 6,859,724 B2 | 2/2005 | Komatsu | |
| 6,950,744 B2 * | 9/2005 | Daizen | 701/425 |
| 7,164,988 B2 * | 1/2007 | Kato | 701/461 |
| 7,650,235 B2 * | 1/2010 | Lee et al. | 701/428 |
| 2001/0044694 A1 * | 11/2001 | Ukita | 701/211 |
| 2003/0195700 A1 * | 10/2003 | Hamada et al. | 701/208 |
| 2004/0158399 A1 * | 8/2004 | Kato | 701/209 |
| 2004/0172193 A1 | 9/2004 | Monde et al. | |
| 2004/0201501 A1 * | 10/2004 | Daizen | 340/995.16 |

FOREIGN PATENT DOCUMENTS

| | | | | |
|---|---|---|---|---|
| JP | 2002-208019 A | | 7/2002 | |
| JP | 2002-286476 A | | 10/2002 | |
| JP | 2002-328031 A | | 11/2002 | |
| JP | 2003-121186 A | | 4/2003 | |
| JP | 2003172624 | * | 6/2003 | G09B 29/00 |
| JP | 2004-170233 A | | 6/2004 | |
| JP | 2004-251701 A | | 9/2004 | |

* cited by examiner

CAR NAVIGATION APPARATUS

FIELD OF THE INVENTION

The present invention relates to a car navigation apparatus which searches for a route to a destination and carries out route guidance. More particularly, it relates to a technology for easily acquiring facility information about facilities in the vicinity of an intersection on the route which is searched for.

BACKGROUND OF THE INVENTION

Conventionally, a car navigation apparatus having a function of displaying a list of the names of intersections either in the vicinity of a vehicle in which the car navigation apparatus is mounted or on a searched route while the vehicle is traveling along the searched route is known. Since this car navigation apparatus aims at informing the user of intersections in the vicinity of the vehicle or on the route so as to guide the user to the destination safely, it only has either the function of displaying the list of the intersections, or a function of displaying a map of an area including or intersection information about an intersection which is selected from the displayed intersection list (the intersection's name, the number of lanes of the intersection, etc.).

On the other hand, a car navigation apparatus usually has various surrounding facilities searching services, such as a vehicle position surrounding facilities searching service, a map point surrounding facilities searching service, a place-of-arrival surrounding facilities searching service, and a route surrounding facilities searching service. However, there have been provided no car navigation apparatus having a function of selecting a desired intersection from a list of intersections on a searched route to perform a search for surrounding facilities in the vicinity of the desired intersection.

Therefore, in order to search for surrounding facilities in the vicinity of a selected intersection, the user needs to cause the related art car navigation apparatus to stop route guidance and display a map of an area including the selected intersection on the screen, move a cursor to the desired intersection on the map using a remote controller or a joystick to set a point to be searched, and, after that, cause the related art car navigation apparatus to perform a search for surrounding facilities in the vicinity of the set point to be searched. This related art car navigation apparatus thus makes the user have the trouble of moving the cursor to the specific point on the map, and this operation of positioning the cursor at the desired intersection on the map causes the user to stare at the screen inevitably, thereby preventing the user from driving the vehicle. When the user can specify a point on the map by manipulating a touch panel with a finger, he or she does not need to stare at the screen. However, a drawback is that when the vehicle is currently located in a large city, for example, and a very large number of intersections are displayed on the screen, it is difficult for the user to specify the desired intersection correctly.

Although a method of allowing the user to directly specify an intersection on a map for route guidance can be alternatively considered as the method of specifying the intersection, when the map is automatically scrolled around as the vehicle moves, when the desired intersection exists in an edge of the screen display, when the desired intersection does not exist in the screen display because of the scale of the map, and when a large number of intersections exist in the screen display, it is difficult for the user to perform such an operation of specifying the desired intersection. Although a method of specifying an intersection by specifying a street which crosses the road along which the vehicle is currently traveling, and performing a search for surrounding facilities in the vicinity of the specified intersection can be also considered, it cannot be used when no name is given to the street and when the user does not know the name of the street.

Patent reference 1 discloses, as a related technology, a route-to-be-traveled guidance apparatus for displaying both the current position on a map of a vehicle in which the guidance apparatus is mounted and the names of a plurality of intersections on a guidance route and in the vicinity of the current position on a display. This route-to-be-traveled guidance apparatus reads the names of a plurality of intersections on the guidance route and in the vicinity of the current position, which are selected through route searching, from a CD-ROM 7, and collectively displays the names of the plurality of intersections on a liquid crystal display on which a map, a mark indicating the vehicle, etc. are displayed. As a result, the user can grasp information about intersections located in a wide area surrounding the current position of the vehicle.

Patent reference 2 discloses a guidance route searching method which a navigation apparatus uses to search for a guidance route passing through roads which are to the user's liking and are extending to a destination. In accordance with this guidance route searching method, a first route from the place of departure to the destination is searched for, and intersections on the route are displayed in the form of a list. When the user selects a desired intersection from among the intersections on the first route, and specifies a traveling direction in which the vehicle should go out of the desired intersection, the method reduces the link cost of the road which is extending in the specified direction from the selected intersection, and searches for a route (i.e., a second route) extending from the intersection to the destination. The method then combines a part of the first route, which is extending from the place of departure to the desired intersection, and the second route into a guidance route.

Patent reference 3 discloses a navigation apparatus which can provide regulations, congestion information, etc. at an appropriate timing, and which enables the user to grasp the conditions of intersections in advance by displaying information about the intersections in advance, for example. This navigation apparatus includes a traffic information detecting means, such as a VICS receiver, for detecting traffic information which exists on a road along which the vehicle should travel, and an intersection information providing means for, when the traffic information detecting means detects traffic information which exists on a road, providing detailed information about the names of intersections located on this side of a location associated with the traffic information which exists on the road along which the vehicle should travel, the distance to each of the intersections, marks respectively indicating the intersections, an intersection map, a lane map, a road map, etc.

[Patent reference 1] JP, 9-133541,A
[Patent reference 2] JP, 2003-121186,A
[Patent reference 3] JP, 2002-286476,A Related art car navigation apparatus have some surrounding facilities searching services, such as a vehicle position surrounding facilities searching service, a map point surrounding facilities searching service, a place-of-arrival surrounding facilities searching service, and a route surrounding facilities searching service, as mentioned above. However, since each of these facilities searching services has an advantage and a disadvantage, they are used so as to be complementary to one another. For example, when the user desires to search for a gas station in a hurry, the related art car navigation apparatus can perform a vehicle position surrounding facilities search. However, there is a possibility that gas stations which exist in a direction opposite to the traveling direction of the vehicle are also searched for in this vehicle position surrounding facilities search. In such a case, since only gas stations which exist in the traveling direction can be searched for when a route surrounding facilities search is performed, the disadvantage of the vehicle position surrounding facilities search can be removed.

However, since all locations on the route become a target to be searched in the route surrounding facilities search, unnecessary gas stations in the vicinity of the point of arrival are searched for, and therefore the route surrounding facilities search takes relatively long time. Therefore, it is necessary to take measures, such as a measure of restricting the area to be searched or the number of facilities to be searched. Under such conditions, the related art car navigation apparatus needs to further have a function of complementing the route surrounding facilities searching function. That is, the related art car navigation apparatus needs to have a facilities searching function of restricting the target to be searched to facilities which exist in the traveling direction of the vehicle and in the vicinity of the vehicle, making the area to be searched substantially wide, and being able to search for the facilities in a short time.

In addition, since there is a high possibility that the user performs mistaken operations under conditions that the use needs to cause the related art car navigation apparatus to perform a search for facilities in a hurry, the number of times that the user performs operations to cause the related art car navigation apparatus to perform a search for facilities has to be reduced as much as possible to simplify the procedure, and the length of time that the user stares at an operation screen display for the procedure has to be reduced. Furthermore, a function of properly searching for information which the user desires to have and providing it for the user so that the user does not need to redo the operations for searching is needed.

The present invention is made in order to meet the above-mentioned requests, and it is therefore an object of the present invention to provide a car navigation apparatus which can provide information about facilities in the vicinity of an intersection quickly according to a user's simple operations.

DISCLOSURE OF THE INVENTION

In order to solve the above-mentioned problems, a car navigation apparatus in accordance with the present invention includes: a map data acquisition means for acquiring map data including road data, intersection information, and facility information; a current position detection means for detecting a current position of a car; a route searching means for searching for a route to a destination based on the map data acquired by said map data acquisition means; an intersection searching means for searching an intersection in a vicinity of the current position from among intersections which are located on the route searched for by said route searching means and which exists between the current position detected by said current position detection means and the destination; an intersection name outputting means for outputting the intersection's name given to the intersection searched for by said intersection searching means; an intersection selecting means for selecting the intersection by specifying the intersection's name outputted by said intersection name outputting means; an facility searching means for searching for a facility which exists in a vicinity of the intersection selected by said intersection selecting means through the map data acquired by said map data acquisition means; a facility name outputting means for outputting the facility's name given to the facility searched for by said facility searching means; a facility selecting means for selecting the facility by specifying the facility's name outputted by said facility name outputting means; and a facility information outputting means for extracting facility information about the facility selected by said facility selecting means from the map data acquired by said map data acquisition means, and for outputting the facility information.

Thus, the car navigation apparatus can output the names of intersections which exist between the current position and the destination so that the user can simply specify one of these outputted intersection names to make the car navigation apparatus search for facilities which exist in the vicinity of the selected intersection and output the names of the facilities. Therefore, the user can make the car navigation apparatus provide information about facilities in the vicinity of the selected intersection by performing a simple operation. Since the car navigation apparatus sets, as a target to be searched, intersections which exist between the current position and the destination, the car navigation apparatus provides an advantage of being able to promptly provide information about desired facilities for the user in a short time.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
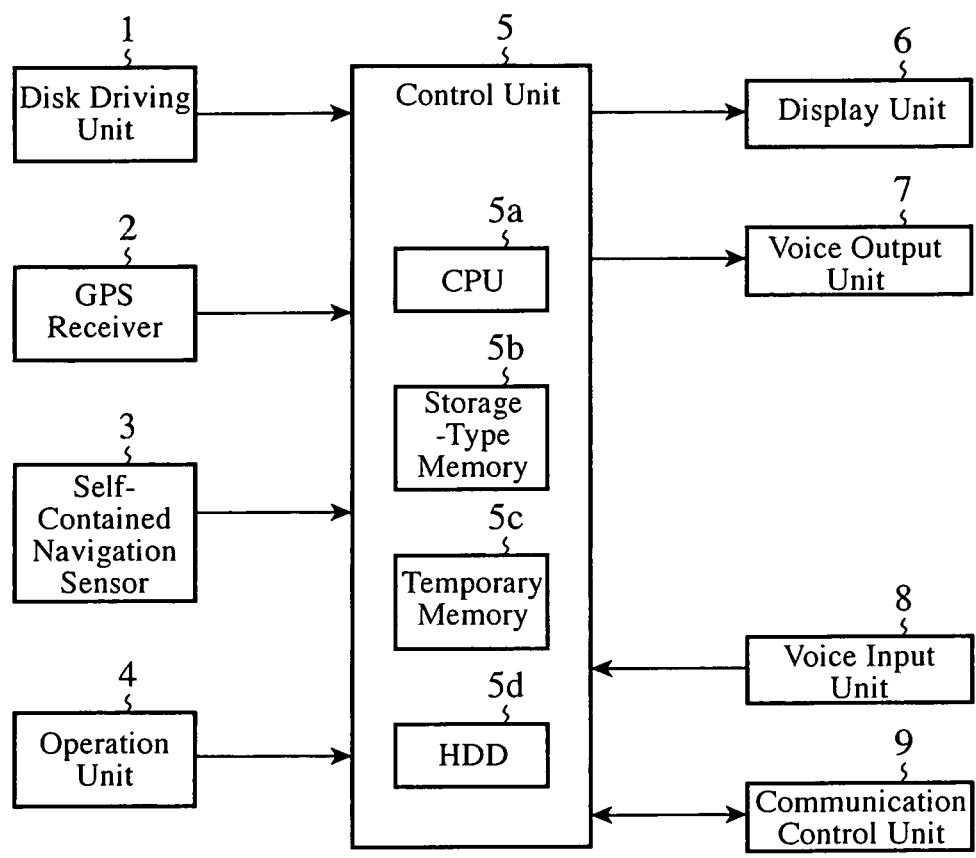
FIG. 1 is a block diagram showing the structure of a car navigation apparatus according to embodiment 1 of the present invention.

FIG. 1 is a block diagram showing the structure of a car navigation apparatus according to embodiment 1 of the present invention. This car navigation apparatus is provided with a disk driving unit 1, a GPS receiver 2, a self-contained navigation sensor 3, an operation unit 4, a control unit 5, a display unit 6, a voice output unit 7, a voice input unit 8, and a communication control unit 9.

The disk driving unit 1 drives a DVD-ROM or CD-ROM to read map data from a map database formed in this medium. Facility information about facilities which are classified, for example, into some categories, such as a shopping center category, a gas station category, and a restaurant category, as well as road information, is included in the map data. The map data read by this disk driving unit 1 are sent to the control unit 5.

The GPS receiver 2 determines the current position (i.e., the latitude and longitude) of a vehicle in which the car navigation apparatus is mounted based on GPS signals acquired by receiving electric waves sent from the GPS satellites. GPS data indicating the current position of the vehicle determined by this GPS receiver 2 is sent to the control unit 5.

The self-contained navigation sensor 3 includes an angle sensor and a velocity sensor (neither of these sensors are shown in the figure). The angle sensor detects the traveling direction of the vehicle in which the car navigation apparatus is mounted. The traveling direction detected by this angle sensor is sent to the control unit 5 as direction data. The velocity sensor measures the number of pulses which are generated every time when the vehicle in which the car navigation apparatus is mounted travels a constant distance. The number of pulses measured by this velocity sensor is sent to the control unit 5 as velocity data.

The operation unit 4 is used in order for the user to manipulate the car navigation apparatus. This operation unit 4 receives operation information sent via, e.g., infrared radiation from a remote controller, generates an operation command corresponding to this received operation information, and sends it to the control unit 5. The operation unit 4 can be constructed of a touch panel placed on the screen of the display unit 6. In this case, the touch panel generates an operation command corresponding to a position thereof which the user touches, and sends it to the control unit 5. The operation unit 4 can be alternatively constructed of a manual operation button, such as a joystick or a cross button, which are disposed on a front surface of the car navigation apparatus.

The display unit 6 is constructed of, for example, a liquid crystal display, and displays a map, a list of intersections (or junctions), or the like according to display data from the control unit 5. The voice output unit 7 is constructed of, for example, a speaker or the like, and carries out guidance by voice according to voice data from the control unit 5. The voice input unit 8 is constructed of, for example, a microphone, converts a voice into a sound signal, and sends it to the control unit 5 as voice data. The voice data delivered from this voice input unit 8 is also used to manipulate the car navigation apparatus using a voice recognition means (not shown) disposed within the control unit 5. The communication control unit 9 is used in order to control communications between the car navigation apparatus and equipment located outside the car navigation apparatus.

The control unit 5 controls the whole of this car navigation apparatus. This control unit 5 includes a central processing unit (referred to as "CPU" from here on) 5a, a storage-type memory 5b, a temporary memory 5c, and a hard disk drive unit (referred to as "HDD" from here on) 5d. The CPU 5a carries out various processes and a process of receiving and delivering data. The storage-type memory 5b consists of, for example, an EEPROM, and stores the current position of the vehicle, a destination, correction values used for the velocity sensor and angle sensor, points on the map which are registered by the user, component setting information for tailoring the settings of some components to the user's liking, etc. The temporary memory 5c consists of, for example, a DRAM, and is used in order to store various pieces of information temporarily. The HDD 5d stores the same map database as that stored in the DVD-ROM, CD-ROM, or the like which is driven by the disk driving unit 1.

Figure 2:
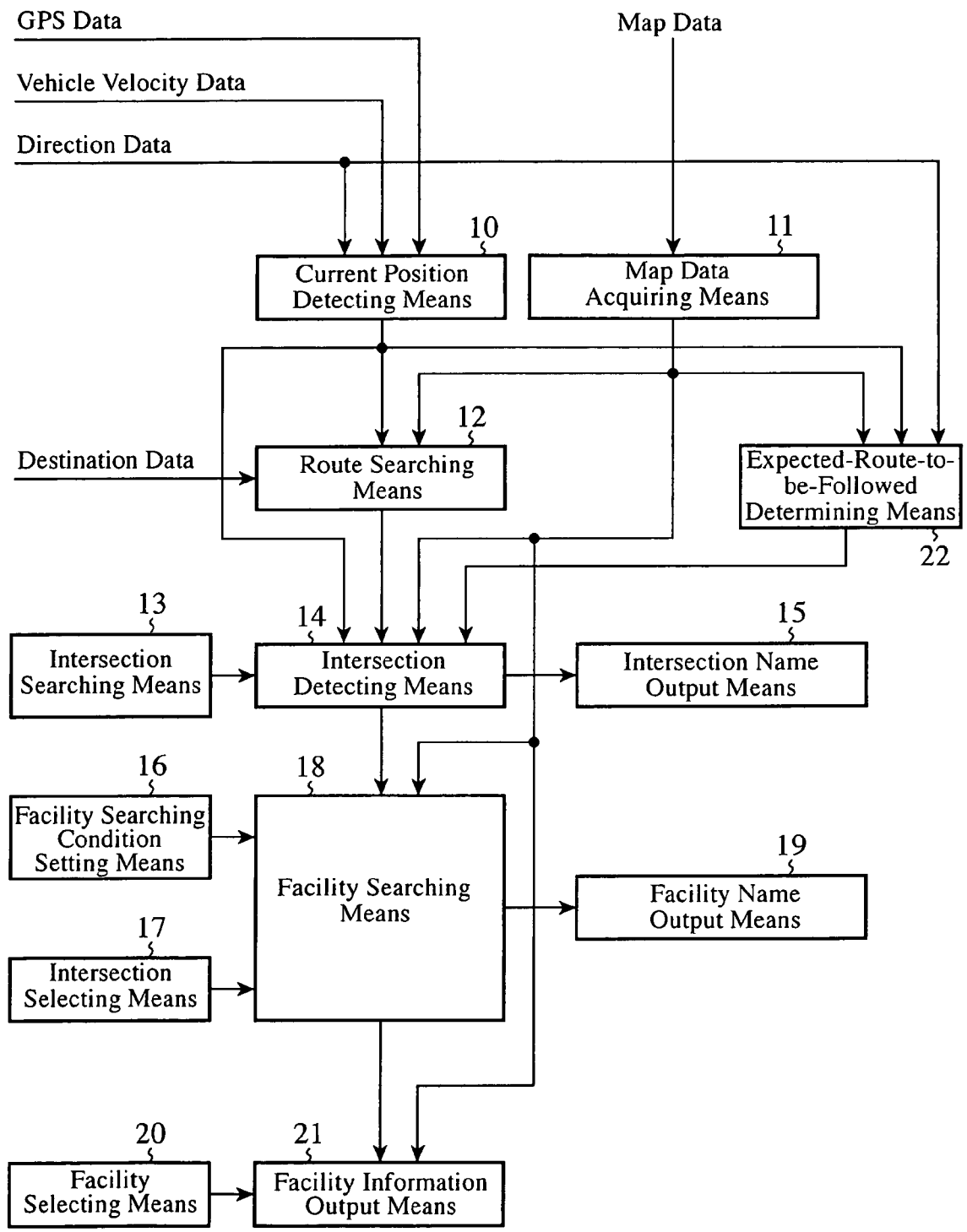
FIG. 2 is a block diagram showing the functional structure of a control unit shown in FIG. 1.

FIG. 2 is a block diagram showing the functional structure of the control unit 5. This control unit 5 is provided with a current position detecting means 10, a map data acquiring means 11, a route searching means 12, an intersection searching condition setting means 13, an intersection searching means 14, an intersection name outputting means 15, a facility searching condition setting means 16, an intersection selecting means 17, a facility searching means 18, a facility name outputting means 19, a facility selecting means 20, a facility information outputting means 21, and an expected-route-to-be-followed determining means 22.

The current position detecting means 10 carries out a predetermined calculation based on the GPS data sent from the GPS receiver 2, the direction data sent from the angle sensor which constitutes the self-contained navigation sensor 3, and the velocity data sent from the velocity sensor which constitutes the self-contained navigation sensor 3, so as to detect the current position of the vehicle in which the car navigation apparatus is mounted. Current position data indicating the current position of the vehicle detected by this current position detecting means 10 is sent to the route searching means 12 and intersection searching means 14.

The map data acquiring means 11 acquires map data from the map database formed in the DVD-ROM or CD-ROM which is mounted into the disk driving unit 1, or the HDD 5d. The map data acquired by this map data acquiring means 11 is sent to the route searching means 12, intersection searching means 14, facility searching means 18, and facility information outputting means 21. The route searching means 12 searches for a route extending from the position specified by the current position data sent from the current position detecting means 10 to a position specified by the destination data delivered from the operation unit 4 based on the map data acquired by the map data acquiring means 11. Guidance route data showing the route which is searched for by this route searching means 12 is sent to the intersection searching means 14.

The intersection searching condition setting means 13 sets intersection searching conditions which are used for specifying intersections which are a target to be searched. To be more specific, the intersection searching condition setting means sets conditions to be imposed on intersections which are a target to be searched, for example, the widths of each road crossing the route, the number of lanes of each road crossing the route, and the type of each road crossing the route, such as a national road or prefectural road, at each intersection according to the user's operation of the operation unit 4. The intersection searching conditions set by this intersection searching condition setting means 13 are sent to the intersection searching means 14. The intersection searching means 14 searches for intersections in the vicinity of the current position of the vehicle from among intersections which are located on the route shown by the guidance route data sent from the route searching means 12, and which exist between the current position detected by the current position detecting means 10 and the destination based on the map data acquired by the map data acquiring means 11 and according to the intersection searching conditions set by the intersection search condition setting means 13. The names of the intersections searched for by this intersection searching means 14 are sent to the intersection name outputting means 15.

The intersection name outputting means 15 sends the names of some of the intersections, which are located in the most vicinity of the vehicle, to the display unit 6. As a result, as shown in, for example, FIG. 8, some intersection names are displayed on a left half of the screen of the display unit 6. The facility searching condition setting means 16 sets facility searching conditions which are used for specifying facilities which are a target to be searched. To be more specific, the facility searching condition setting means sets a distance from a selected intersection to facilities which are the target to be searched, or a traveling time required for the vehicle to travel from the selected intersection to the target facilities, a restriction imposed on directions in which the vehicle can go out of the intersection (e.g., only going straight and left turn, only going straight and right turn, highway, or prefectural road), the type of the target facilities (hotel, restaurant, gas station, or the like), and functions which the target facilities should have (existence of parking lot or the like), according to the user's operation of the operation unit 4. The facility searching conditions set by this facility searching condition setting means 16 are sent to the facility searching means 18.

The intersection selecting means 17 selects an intersection by specifying the name of the intersection which is displayed on the display unit 6 by the intersection name outputting means 15 according to the user's operation of the operation unit 4. Data showing the intersection selected by this intersection selecting means 17 is sent to the facility searching means 18. The facility searching means 18 searches for surrounding facilities in the vicinity of the intersection selected by the intersection selecting means 17 based on the map data acquired by the map data acquiring means 11 according to the facility searching conditions set by the facility searching condition setting means 16. Information about the facilities searched for by this facility searching means 18 is sent to the facility name outputting means 19.

Figure 11:
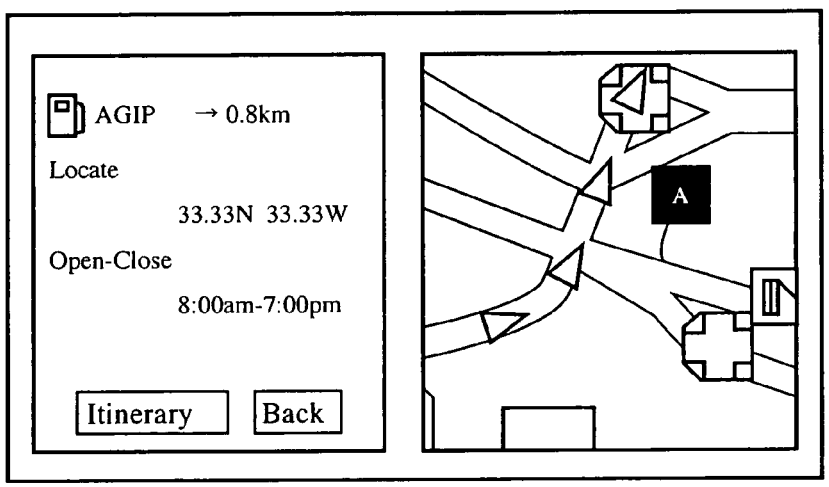
FIG. 11 is a diagram showing an example of a screen display of detailed information about facilities in the car navigation apparatus according to embodiment 1 of the present invention.

The facility name outputting means 19 sends the names of the searched facilities to the display unit 6. As a result, as shown in, for example, FIG. 9, the names of the facilities are displayed on the left half of the screen of the display unit 6 in the form of a list. The facility selecting means 20 selects a facility from the facilities by specifying the name of the facility which is displayed on the display unit 6 by the facility name outputting means 19 according to the user's operation of the operation unit 4. Data showing the facility selected by this facility selecting means 20 is sent to the facility information outputting means 21. The facility information outputting means 21 extracts detailed information about the selected facility from the map data acquired by the map data acquiring means 11, and sends it to the display unit 6. As a result, as shown in, for example, FIG. 11, the detailed information about the selected facility is displayed on the left half of the screen of the display unit 6.

The expected-route-to-be-followed determining means 22 calculates a link cost based on the direction data showing the traveling direction, which is acquired from the angle sensor which constitutes the self-contained navigation sensor 3, and the width, number of lanes, etc. of each road which crosses the road along which the vehicle is traveling, which are included in the map data acquired by the map data acquiring means 11, and determines a route having the lowest link cost as an expected route to be followed. The link cost of a route is a value which is multiplied by a constant which varies according to the width and type of each road on the route, the number of times that the vehicle will make a right or left turn when traveling the route, etc. for route searching, and is evaluated in order to optimize the guidance route. Data indicating the expected route to be followed determined by the expected-route-to-be-followed determining means 22 is sent to the intersection searching means 14.

Next, the operation of the car navigation apparatus according to embodiment 1 of the present invention which is constructed as mentioned above will be explained.

Figure 3:
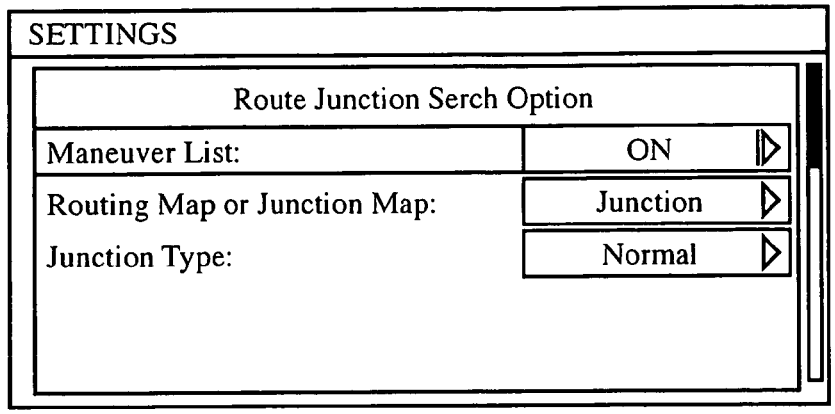
FIG. 3 shows an example of a setting screen display of a list of intersections which is used in the car navigation apparatus according to embodiment 1 of the present invention.
Figure 9:
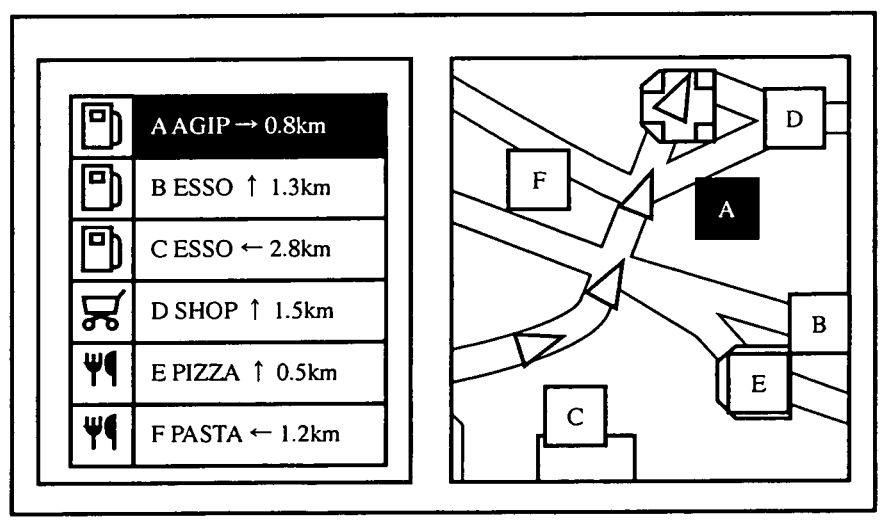
FIG. 9 is a diagram showing another example of the screen display of a list of intersections in the car navigation apparatus according to embodiment 1 of the present invention.

The user first sets conditions, such as a searching condition which is suited to the user's liking, and a route guidance condition before setting a destination and causing the car navigation apparatus to start route guidance. In other words, when performing a search for facilities in the vicinity of an intersection on the route, since the car navigation apparatus needs to display a list of intersections while carrying out the route guidance, the user performs a predetermined operation on the operation unit 4 to cause the car navigation to display a setting screen for display of intersection list as shown in FIG. 3. The user then sets "Maneuver List" to ON. As a result, the display unit is placed in a state where the display of an intersection list is activated, the intersection list is displayed on the left half of the screen of the display unit 6, as shown in FIG. 9, and a route guidance map is displayed on the right half of the screen. In the setting screen for display of intersection list, in order to obtain a list of facilities needed for the user, the user is allowed to specify conditions imposed on intersections to be searched, for example, "the types of crossing roads", "national road or city street intersection", "highway intersection", "intersection having two or more lanes", etc. Information stored as road attributes or intersection attributes included in the map data can be used as these conditions.

Figure 4:
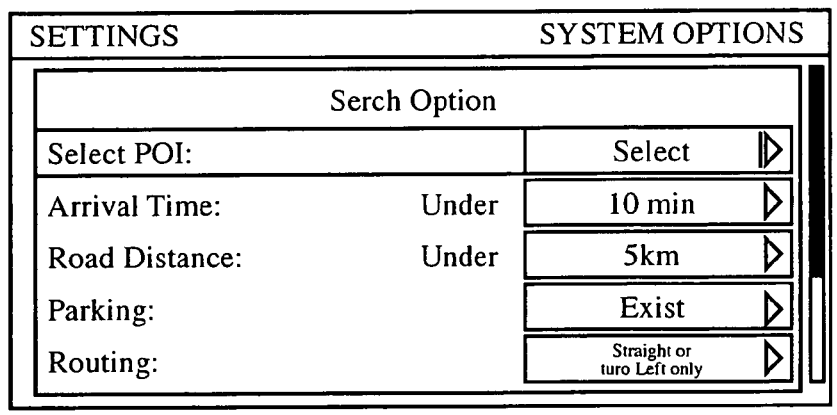
FIG. 4 shows an example of a setting screen display for setting facility searching conditions which are used in the car navigation apparatus according to embodiment 1 of the present invention.

When setting facility searching conditions, the user performs a predetermined operation on the operation unit 4 so as to cause the car navigation apparatus to generate a setting screen display, as shown in FIG. 4, for setting of the facility searching conditions. In this screen display, the user can set a distance from the intersection to facilities to be searched or a traveling time required for the vehicle to travel from the selected intersection to the target facilities, existence of parking lots in the target facilities, restrictions on the entry of the vehicle into the target facilities indicating whether the vehicle easily arrives at the facilities, etc. When setting a distance from the intersection to the facilities to be searched, the user specifies the distance from the intersection which the user selects for a search for facilities. When the user sets a traveling time required for the vehicle to travel from the intersection to the facilities to be searched, the traveling time is converted into a distance using the average velocity of the vehicle. The average velocity is defined in advance as a constant, or is calculated based on the velocity data acquired from the velocity sensor which constitutes the self-contained navigation sensor 3. As facilities which the vehicle can easily reach (i.e., restrictions on the entry of the vehicle into facilities), the user specifies facilities which the vehicle can reach after preferably moving straight forward or making a left turn (or moving straight forward or making a right turn) with respect to the traveling direction of the vehicle. In this case, the car navigation apparatus carries out a search for facilities using route searching information, such as a link cost, and a node cost, which is included in the map data.

Figure 5:
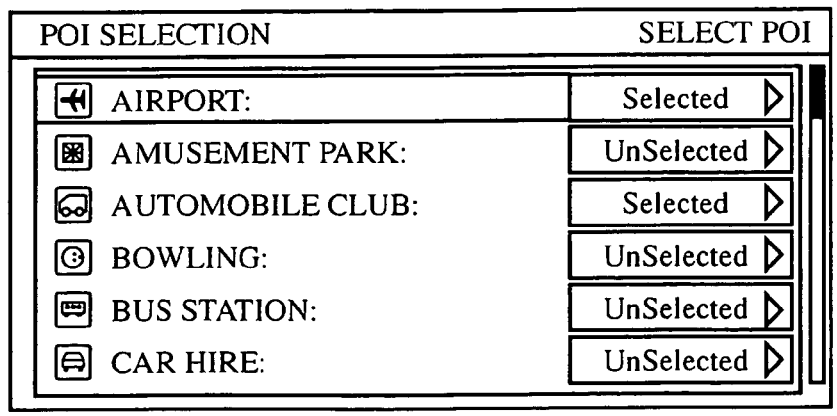
FIG. 5 shows an example of a setting screen display for setting the details of the types of facilities which are used in the car navigation apparatus according to embodiment 1 of the present invention.

When the user desires to restrict facilities which are the target to be searched, he or she manipulates a "Select" button of the screen shown in FIG. 4 so as to cause the car navigation apparatus to generate a screen display for setting of the details of the types of facilities as shown in FIG. 5. The user then specifies facilities which are the target to be searched. FIG. 5 shows an example in which airports (AIRPORT) and gas stations (AUTOMOBILE CLUB) are selected as the target facilities. The conditions set as mentioned above are registered into the storage-type memory 5b. Thus, since only facilities of the registered types are displayed in the list of searched facilities after a search for facilities is carried out, the user can recognize only the displayed, needed list of facilities.

Figure 6:
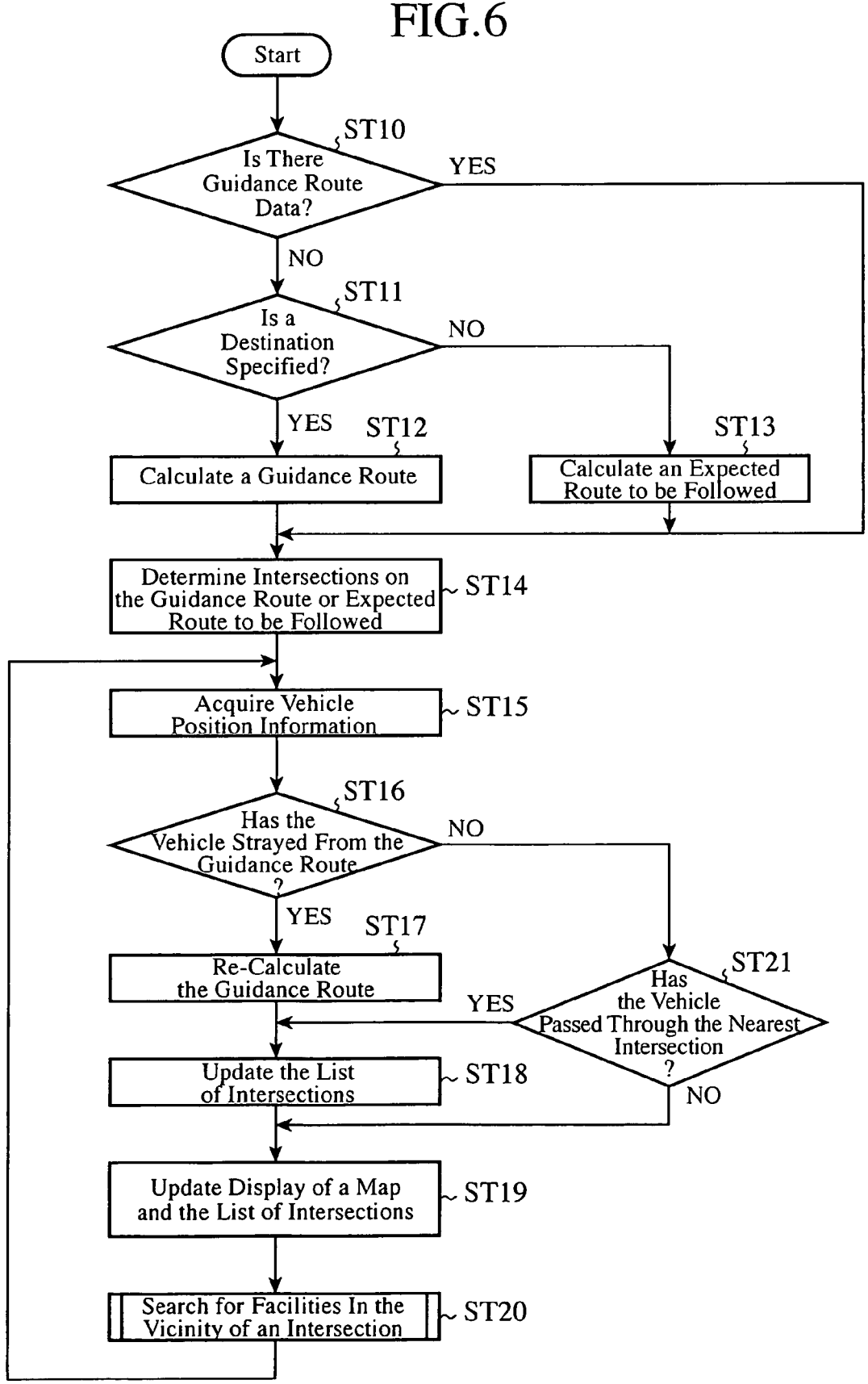
FIG. 6 is a flow chart showing intersection searching processing carried out by the car navigation apparatus according to embodiment 1 of the present invention.
Figure 7:
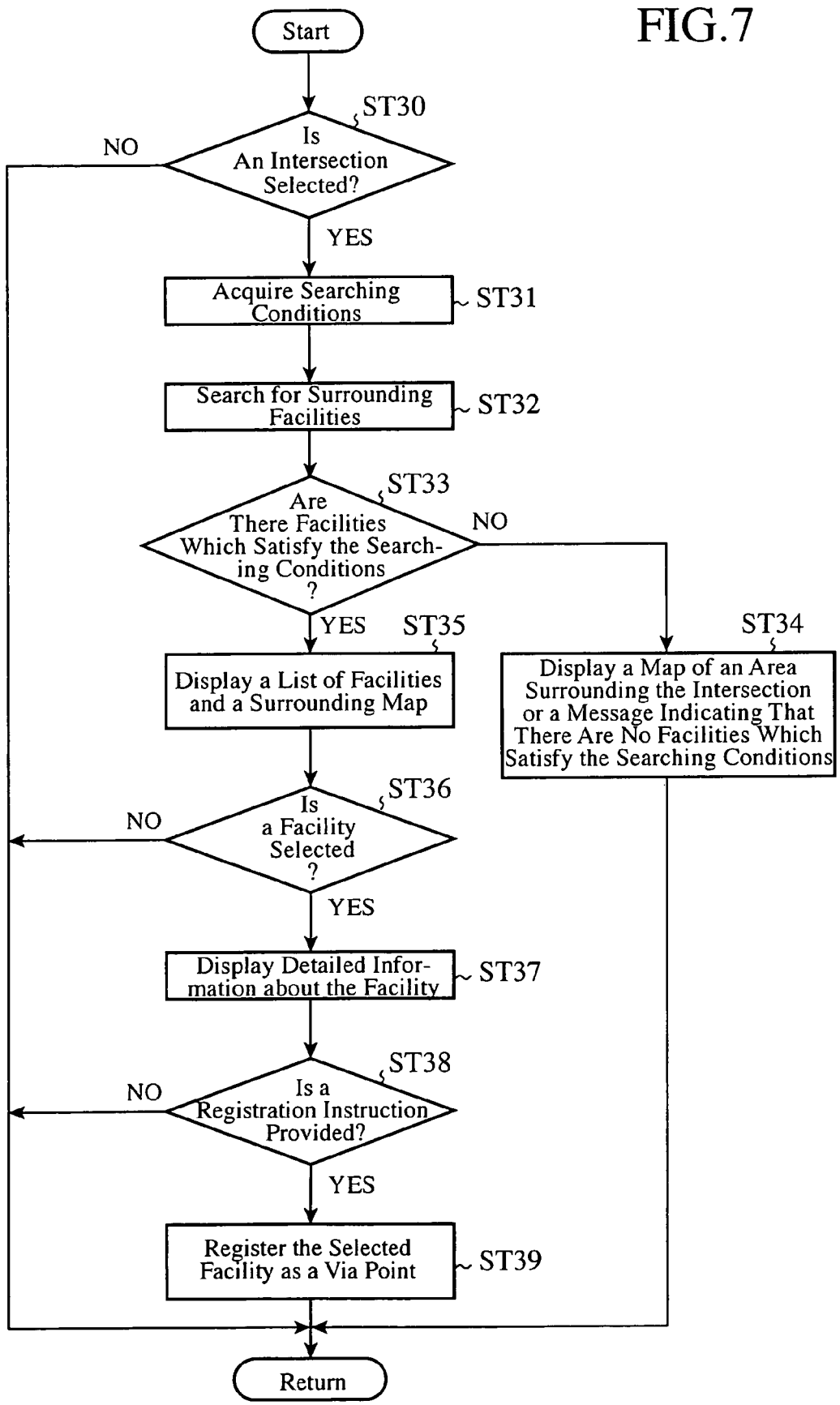
FIG. 7 is a flowchart showing facility searching processing carried out by the car navigation apparatus according to embodiment 1 of the present invention.

When the settings mentioned above are completed, the control unit 5 carries out intersection searching processing shown in a flow chart of FIG. 6, and facility searching processing shown in a flow chart of FIG. 7.

First, the control unit checks to see whether guidance route data already exists (in step ST10). In other words, the control unit checks to see whether a route search has been made by the route searching means 12. When determining that no guidance route data exists (any destination is not specified), the control unit then checks to see whether or not a destination is specified (in step ST11). When determining that a destination is specified, the control unit carries out a determination of a guidance route, i.e., a search for a route to the destination (in step ST12). After that, the control unit advances the sequence to step ST14. When, in above-mentioned step ST11, determining that any destination is not specified, the control unit determines an expected route to be followed (in step ST13). In other words, the expected-route-to-be-followed determining means 22 determines an expected route to be followed, and sends expected route to be followed data about the expected route to be followed to the intersection searching means 14. After that, the control unit advances the sequence to step ST14. When, in above-mentioned step ST10, determining that guidance route data exists, the control unit advances the sequence to step ST14.

The control unit, in step ST14, acquires intersections which exist in either the route indicated by the guidance route data or the expected route to be followed indicated by the expected route to be followed data. The control unit then creates a list of intersections from the acquired intersections. The intersection list includes the names of some intersections in the vicinity of the current position of the vehicle, which are listed in order that they will be passed through. The control unit then acquires the vehicle position information about the current position of the vehicle (in step ST15). In other words, the intersection searching means 14 acquires the current position data from the current position detecting means 10. The control unit then checks to see whether the vehicle has strayed from the guidance route (in step ST16). The control unit carries out this process by checking to see whether the current position indicated by the current position data acquired in step ST15 exists on the guidance route. When determining that the vehicle has strayed from the guidance route, the control unit carries out a re-determination of the guidance route (in step ST17). After that, the control unit advances the sequence to step ST18.

When, in above-mentioned step ST16, determining that the vehicle has not strayed from the guidance route, the control unit checks to see whether the vehicle has passed through the nearest intersection (in step ST21). When determining that the vehicle has passed through the nearest intersection, the control unit advances the sequence to step ST18. On the other hand, when determining that the vehicle has not passed through the nearest intersection yet, the control unit advances the sequence to step ST19.

The control unit, in step ST18, updates the intersection list. The control unit then updates the display of the map and intersection list (in step ST19). The control unit also carries out a search for facilities in the vicinity of an intersection (in step ST20). In the search for facilities in the vicinity of an intersection, the control unit searches for surrounding facilities in the vicinity of an intersection specified by the user, as will be mentioned later in detail. After that, the control unit returns the sequence to step ST15 in which it repeats the above-mentioned processing.

Figure 8:
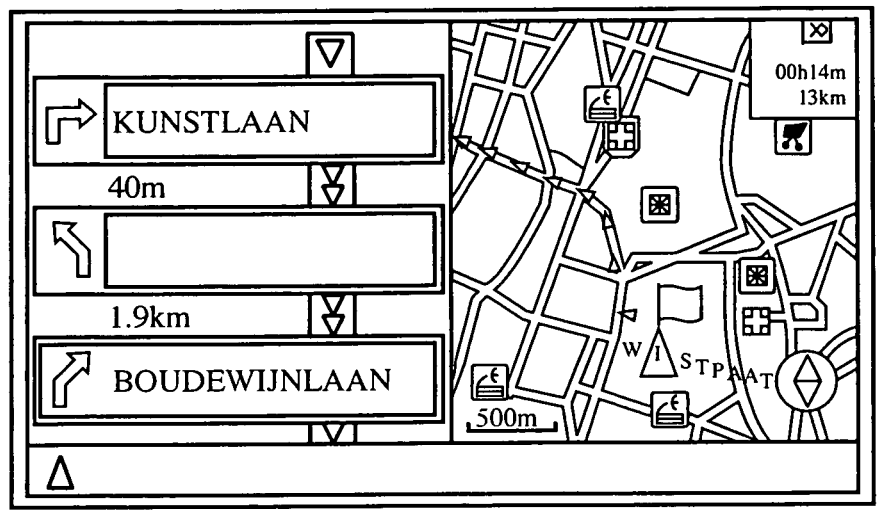
FIG. 8 is a diagram showing an example of a screen display of a list of intersections in the car navigation apparatus according to embodiment 1 of the present invention.

With the above-mentioned processing, the control unit always displays the list of nearby intersections on the left half of the screen of the display unit 6 which is providing route guidance, and also displays a map for route guidance which contains a mark indicating the current position of the vehicle on the right half of the screen of the display unit, as shown in FIG. 8. Then, when the vehicle has passed through the nearest intersection or when the vehicle has strayed from the guidance route and a re-determination of the guidance route is carried out, the control unit updates the list of intersections. Every time when the current position of the vehicle changes, the control unit updates the map containing the current position mark indicating the current position of the vehicle. In the example of the screen display shown in FIG. 3, the screen is divided into two portions and the list of intersections is displayed on the left-hand side of the screen. This screen display is shown as an example, and the layout of the number of screen portions, the number of intersections included in the intersection list, and so on are arbitrary as long as the map for route guidance and the intersection list are simultaneously displayed on the screen.

Next, the details of the process of searching for facilities in the vicinity of an intersection, which is performed in above-mentioned step ST20, will be explained with reference to the flow chart of FIG. 7.

In this facility searching processing, the control unit checks to see whether or not an intersection is selected first (in step ST30). As an intersection selecting method, a method of allowing the user to select an intersection's name from the list of intersections by using a remote controller, a joystick, a cross button, speech recognition, or the like, or to select an intersection by pushing a predetermined button, such as an intersection 1 button or intersection 2 button, or a method of allowing the user to select a desired intersection by touching it from a shown list of intersections when the operation unit 4 consists of a touch panel can be adopted.

When, in step ST30, determining that any intersection is not selected, the control unit returns the sequence from this facility searching processing to the processing shown in the flow chart of FIG. 6 On the other hand, when determining that an intersection is selected, the control unit acquires the searching conditions (in step ST31). In other words, the control unit acquires the facility searching conditions set by the facility searching condition setting means 16. The control unit then carries out a search for surrounding facilities (in step ST32). In other words, the facility searching means 18 searches for surrounding facilities in the vicinity of the intersection selected, in step ST30, by the intersection selecting means 17 based on the map data acquired by the map data acquiring means 11 from the map database, and according to the facility searching conditions set, in step ST32, by the facility searching condition setting means 16. The range to be searched is an area at a constant distance from the position (i.e., the latitude and longitude) of the selected intersection.

Figure 10:
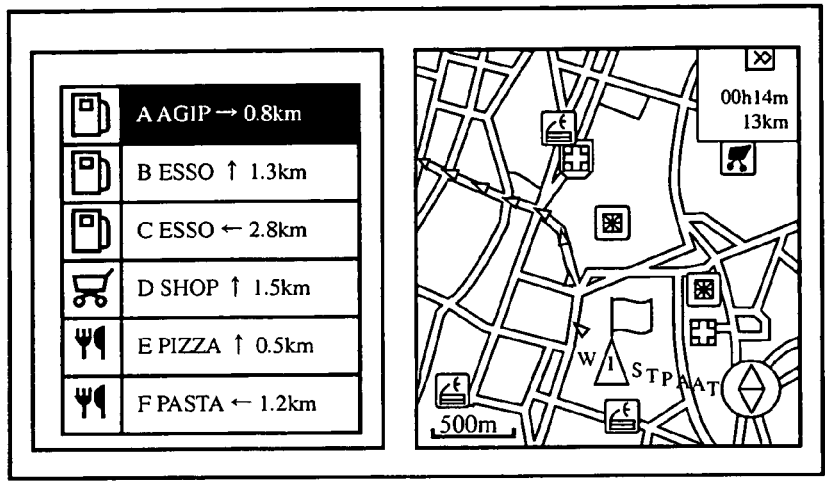
FIG. 10 is a diagram showing an example of a screen display of a list of facilities in the car navigation apparatus according to embodiment 1 of the present invention.

The control unit then checks to see whether facilities which satisfy the facility searching conditions exist (in step ST33). When then determining that no facilities which satisfy the facility searching conditions exist, the control unit displays a surrounding map of an area including the intersection or a message indicating that no facilities which satisfy the facility searching conditions exist (in step ST34), and ends the facility searching processing. After that, the control unit returns the sequence to the processing shown in the flow chart of FIG. 6. On the other hand, when, in step ST33, determining that facilities which satisfy the facility searching conditions exist, the control unit displays a list of the facilities and a surrounding map (in step ST35). In other words, the control unit generates a list of the names of the facilities searched in step ST32, combines this generated list of the names of the facilities and the surrounding map of the area including the intersection which is displayed when the selection of the intersection is carried out by using the facility name outputting means 19, as shown in FIG. 9, and displays the combined image on the display unit 6. Although the control unit is so constructed as to, in step ST35, display the facility namelist and the surrounding map of the intersection, as shown in FIG. 9, the control unit can alternatively display the facility namelist and the map for route guidance, as shown in FIG. 10. In this case, the user can set in advance whether the control unit will display either the combination of a facility namelist and a surrounding map of the intersection, as shown in FIG. 9, or the combination of a facility namelist and a map for route guidance, as shown in FIG. 10, so that the control unit can display either of the combinations according to the setting in step ST35.

Figure 12:
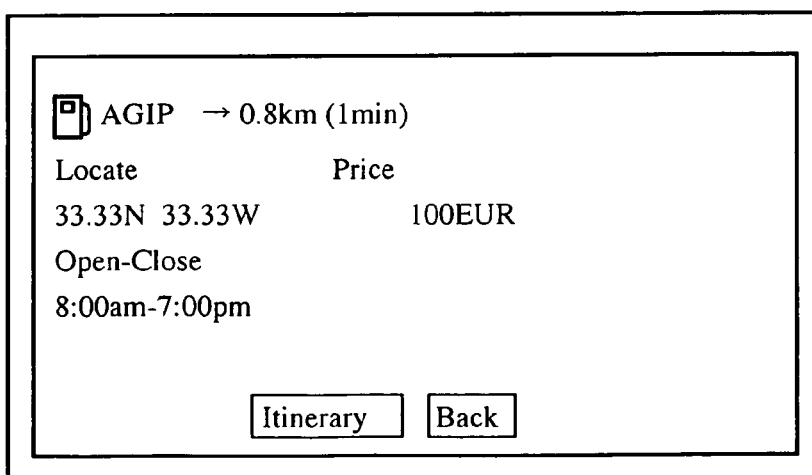
FIG. 12 is a diagram showing another example of the screen display of detailed information about facilities in the car navigation apparatus according to embodiment 1 of the present invention.

The control unit then checks to see whether or not one facility's name is selected from the facility list as shown in FIG. 9 (in step ST36). When determining that one facility is selected, the control unit displays detailed information about the selected facility (in step ST37). In other words, the facility information outputting means 21 extracts the detailed information about the selected facility out of the map data acquired from the map database by the map data acquiring means 11, and sends it to the display unit 6. The control unit thus displays the detailed information about the facility on the left half of the screen of the display unit 6, as shown, for example, in FIG. 11. In this case, the control unit can alternatively display the detailed information about the facility on the whole screen of the display unit 6, as shown in FIG. 12. An "Itinerary" button and a "Back" button are formed in the screen in which the detailed information about the facility is shown. The "Itinerary" button is used in order for the user to instruct the car navigation apparatus to register the facility currently being displayed on the display unit 6 as a via point or the destination. The "Back" button is used in order for the user to instruct the car navigation apparatus to switch to the initial screen in which the map for route guidance is shown.

The control unit then checks to see whether or not a registration instruction is provided (in step ST38). In other words, the control unit checks to see whether or not the "Itinerary" button is pushed. When determining that the registration instruction is provided, that is, when determining that the "Itinerary" button is pushed, the control unit registers, as a via point (or the destination), the selected facility into the storage-type memory 5b (in step ST39). After that, the control unit returns the sequence to the processing shown in the flow chart of FIG. 6. On the other hand, when, in step ST38, determining that no registration instruction is provided, that is, when determining that the "Back" button is pushed, the control unit returns the sequence to the processing shown in the flow chart of FIG. 6. As a result, the display unit returns to the initial screen in which the list of intersections and the map for route guidance are shown. Also when no facility name is selected in above-mentioned step ST36, the control unit returns to the processing shown in the flow chart of FIG. 6.

As previously explained, the car navigation apparatus according to embodiment 1 of the present invention does not need to switch from a screen display for route guidance to another screen display in order to carry out a search for facilities, and, by simply allowing the user to specify the name of an intersection which exists between the current position and the destination and which is currently shown in the display unit 6 by using the operation unit 4, searches for and outputs facilities which exist in the vicinity of the intersection. Therefore, the car navigation apparatus can provide information about facilities in the vicinity of a selected intersection in response to the user's simple operations. As a result, the present invention offers a useful advantage from a safe driving standpoint. In addition, since only intersections which exist on either a guidance route extending from the current position of the vehicle to the destination or an expected route to be followed which is extending from the current position in the direction in which the vehicle is headed are defined as the target to be searched, the car navigation apparatus can promptly provide desired facilities in a short time.

Since the user is allowed to specify the types of a road which crosses the route, such as a national road or city street, at each target intersection to be searched, the number of lanes of a road which crosses the route at each target intersection to be searched, or searching conditions that a higher priority is given to going-straight and left-turn than to right-turn, and facility searching conditions that a higher priority is given to facilities with a parking lot entrance facing a road included in the route, the car navigation apparatus can easily perform a search for facilities which the user desires.

Since the car navigation apparatus allows the user to use a speech recognition function or a touch panel in order to perform various kinds of inputs, the car navigation apparatus can perform a search for facilities more easily. In addition, since the car navigation apparatus allows the user to specify the facility searching conditions set for searching surrounding facilities in advance, the car navigation apparatus can exactly provide information which the user desires to the user.

INDUSTRIAL APPLICABILITY

As mentioned above, the car navigation apparatus in accordance with the present invention is suitable for searching facilities in the vicinity of a target intersection.

The invention claimed is:

1. A car navigation apparatus configured to search facilities in a vicinity of an intersection which exists on a route comprising:
   a GPS receiver that detects a current position of a car;
   a user interface that receives user input;
   a display; and
   a controller configured to
      determine a route to a user-identified destination by searching map data that includes road data, said map data further including intersection information identifying various roads along said route and roads intersecting therewith and facility information identifying various types of facilities within a geographic region of said map data, said determined route including a route to be followed by the car from the current position to the user-identified destination and comprising a combination of a plurality of road sections to be traveled from said current position of said car to said user-identified destinations;

search intersections within a predefined vicinity of the current position of the car from among intersections which exist on the route ahead of the current position of the car and along the route to the user-identified destination;

provide route guidance to a user along the route to the user-identified destination including displaying a route guidance screen including
- a map indicating the guided route or a portion of the guided routed based on the scale of the displayed map,
- a current position indicator indicating the current position of the car as calculated by said GPS receiver, and
- an intersection name listing displaying an ordered sequence of intersection names corresponding to upcoming intersections on the guided route ahead of the current position of the car and along the guided route, where the intersection names are displayed in the order to be crossed along the guided route and allow the user to physically designate an individual one of the intersection names during route guidance;

interactively receive, during route guidance, a physical designation, from the user, of an individual one of the listed intersection names;

search, in response to receiving the physical designation of the individual intersection and during route guidance, for facilities which exist in a vicinity of the individual intersection physically designated by the user by referring to the map data;

output, as a result of the search for facilities, a facility category listing including a plurality of facility categories corresponding, respectively, to the facilities determined by the search to exist in the vicinity of the individual intersection physically designated by the user;

update the route guidance screen to include the plurality of outputted facility categories which correspond to the facilities which exist in the vicinity of the individually designated intersection, wherein facility category listing is displayed as a list on a separate portion of the updated guidance screen than the portion where the map indicating the guided route, or a portion of the guided route based on the scale of the map is displayed, and facility categories for facilities existing in the vicinity of non-designated intersections are not displayed, such that the user can visually associate the plurality of facility categories with the individual intersection that has been interactively designated by the user, and continuously update the route guidance screen based on the current position of the car as determined by said GPS receiver by removing one or more displayed intersection names in the ordered sequence list of displayed intersection names that are no longer ahead of the current position of the car along the guided route, wherein the map indicating the guided route, or a portion of the guided route based on the scale of the map, is displayed on a first portion of the screen and the ordered sequence list of intersection names is displayed on a second portion of the screen, wherein the first portion of the screen and the second portion of the screen are side-by-side such that the user can visually associate the ordered sequence list of upcoming intersections as displayed on the second portion of the screen in relation to the map indicating the guided route or a portion of the guided route displayed on the first portion of the screen.

2. The car navigation apparatus according to claim 1, wherein said control unit is further configured to set facility searching conditions for specifying facilities which are a target to be searched, and the facilities which exist in a vicinity of the of the individual intersection physically designated by the user are searched according to a facility searching condition designated by the user.

3. The car navigation apparatus according to claim 2, wherein the facility searching conditions includes at least one of a distance from the individual intersection, a direction in which the car is allowed to go from the individual intersection and types of facilities and functions provided by facilities.

4. The car navigation apparatus according to claim 2, wherein the facility searching conditions set by the searching condition setting unit include a restriction imposed on directions in which the car can go out of the individual intersection selected by the intersection selecting unit.

5. The car navigation apparatus according to claim 2, wherein the facility searching conditions set by the searching condition setting unit include types of facilities or functions provided by facilities.

6. The car navigation apparatus according to claim 1, further comprising:
an angle sensor configured to detect a traveling direction of the car, and
said controller is further configured to
determine an expected route to be followed by the car in case that the destination is not designated, based on the traveling direction detected by said angle sensor and acquired map data, and
search for intersections in a vicinity of the current position through intersections which exist on the expected route to be followed determined by said expected-route-to-be-followed determining unit when no route is searched for by the route searching unit.

7. The car navigation apparatus of claim 1, wherein the control unit is further configured to
interactively receive, during route guidance, a physical designation, from the user, of an individual one of the plurality of displayed facility categories;
extract facility information about the facility corresponding to the individual facility category designated by the user from the map data; and
output the extracted facility information.

8. A car navigation apparatus configured to search facilities in a vicinity of a connecting road which exists on a route, where a connecting road is a road which meets or crosses the route comprising:
a GPS receiver that detects a current position of a car;
a user interface that receives user input;
a display; and
a controller configured to
determine a route to a user-identified destination by searching map data that includes road data, said map data further including connecting road information identifying various roads along said route and roads connecting therewith and facility information identifying various types of facilities within a geographic region of said map data, said determined route indicating a route to be followed by the car from the current position to the user-identified destination and comprising a combination of a plurality of road sections to be traveled from said current position of said car to said user-identified destination;

search connecting roads within a predefined vicinity of the current position of the car from among connecting roads which exist on the route ahead of the current position of the car and along the route to the user-identified destination;

provide route guidance to a user along the route to the user-identified destination including displaying a route guidance screen including
- a map indicating the guided route or a portion of the guided routed based on the scale of the displayed map,
- a current position indicator indicating the current position of the car as calculated by said GPS receiver, and
- a connecting road name listing displaying an ordered sequence of connecting road names corresponding to upcoming intersections on the guided route ahead of the current position of the car and along the guided route, where the connecting road names are displayed in the order to be crossed along the guided route and allow the user to physically designate an individual one of the connecting road names during route guidance;

interactively receive, during route guidance, a physical designation, from the user, of an individual one of the listed connecting road names;

search, in response to receiving the physical designation of the individual connecting road searching and during route guidance, for facilities which exist in a vicinity of the individual connecting road physically designated by the user by referring to the map data;

output, as a result of the search for facilities, a facility category listing including a plurality of facility categories corresponding, respectively, to the facilities determined by the search to exist in the vicinity of the individual connecting road physically designated by the user;

update the route guidance screen to include the plurality of outputted facility categories which correspond to the facilities which exist in the vicinity of the individually designated connecting road, wherein the facility category listing is displayed as a list on a separate portion of the updated guidance screen than the portion where the map indicating the guided route, or a portion of the guided route based on the scale of the map, is displayed, and facility categories for facilities existing in the vicinity of non-designated connecting roads are not displayed, such that the user can visually associate the plurality of facility categories with the individual connecting road that has been interactively designated by the user, and continuously update the route guidance screen based on the current position of the car as determined by said GPS receiver by removing one or more displayed connecting road names in the ordered sequence list of displayed connecting road names that are no longer ahead of the current position of the car along the guided route, wherein the map indicating the guided route, or a portion of the guided route based on the scale of the map, is displayed on a first portion of the screen and the ordered sequence list of connecting road names is displayed on a second portion of the screen, wherein the first portion of the screen and the second portion of the screen are side-by-side such that the user can visually associate the ordered sequence list of upcoming connecting roads as displayed on the second portion of the screen in relation to the map indicating the guided route or a portion of the guided route displayed on the first portion of the screen.

9. The car navigation apparatus according to claim 8, wherein said control unit is further configured to set facility searching conditions for specifying facilities which are a target to be searched, and the facilities which exist in a vicinity of the individual connecting road physically designated by the user are searched according to a facility searching condition designated by the user.

10. The car navigation apparatus according to claim 9, wherein the facility searching conditions includes at least one of a distance from the individual connecting road, a direction in which the car is allowed to go from the individual connecting road and types of facilities and functions provided by facilities.

11. The car navigation apparatus according to claim 9, wherein the facility searching conditions set by the searching condition setting unit include a restriction imposed on directions in which the car can go out of the individual connecting road physically designated by the user.

12. The car navigation apparatus according to claim 9, wherein the facility searching conditions set by the searching condition setting unit include types of facilities or functions provided by facilities.

13. The car navigation apparatus according to claim 8, further comprising:
- an angle sensor configured to detect a traveling direction of the car, and
- said controller is further configured to
  - determine an expected route to be followed by the car in case that the destination is not designated, based on the traveling direction detected by said angle sensor and acquired map data, and
  - search for connecting roads in a vicinity of the current position through connecting roads which exist on the expected route to be followed determined by said expected-route-to-be-followed determining unit when no route is searched for by the route searching unit.

14. The car navigation apparatus of claim 8, wherein the control unit is further configured to
- interactively receive, during route guidance, a physical designation, from the user, of an individual one of the plurality of displayed facility categories;
- extract facility information about the facility corresponding to the individual facility category designated by the user from the map data; and
- output the extracted facility information.

* * * * *